United States Patent [19]
Pflieger

[11] Patent Number: 4,846,431
[45] Date of Patent: * Jul. 11, 1989

[54] CLAMP FOR CONNECTING MODULAR FURNITURE COMPONENTS

[75] Inventor: David C. Pflieger, Two Rivers, Wis.

[73] Assignee: Hamilton Industries, Inc., Two Rivers, Wis.

[ * ] Notice: The portion of the term of this patent subsequent to Jan. 5, 2005 has been disclaimed.

[21] Appl. No.: 128,686

[22] Filed: Dec. 10, 1987

Related U.S. Application Data

[63] Continuation-in-part of Ser. No. 870,889, Jun. 5, 1986, Pat. No. 4,717,102.

[51] Int. Cl.$^4$ ............................................. A47B 96/06
[52] U.S. Cl. .................................. 248/228; 248/231.5; 248/316.5; 248/317; 312/245; 24/569; 24/514
[58] Field of Search ................. 248/228, 316.6, 231.6, 248/72, 74.4, 317, 225.31, 231.5, 316.5; 312/245; 24/514, 502, 569

[56] References Cited

U.S. PATENT DOCUMENTS

| | | | |
|---|---|---|---|
| 819,259 | 5/1906 | White | 24/569 X |
| 1,820,229 | 8/1931 | Korns | 248/72 |
| 1,831,798 | 11/1931 | Alsaker | 248/228 |
| 2,525,505 | 10/1950 | Wiedman | 24/514 X |
| 2,879,969 | 3/1959 | Bamberger | 24/569 X |
| 2,997,764 | 8/1961 | Lantz et al. | 24/502 X |
| 3,039,161 | 6/1962 | Gagnon | 24/514 X |
| 3,042,353 | 7/1962 | O'Mara | 248/544 |
| 3,288,409 | 11/1966 | Bethea Jr. | 248/231.6 X |

FOREIGN PATENT DOCUMENTS 1270366  7/1961  France .................................. 24/569

Primary Examiner—Alvin C. Chin-Shue
Attorney, Agent, or Firm—Tilton, Fallon, Lungmus & Chestnut

[57] ABSTRACT

A clamp particularly suitable for use in removably and adjustably suspending cabinet units from the support rails of counters and other worktops. The clamp has upper and lower jaw members joined by a generally vertical adjustment screw. Each jaw member has a bearing portion at one end that engages a similar bearing portion of the other jaw member when the two members are drawn together by the screw. At their opposite ends, the jaw members are provided with clamping ribs and, because of the greater length of the lower jaw member, the clamping rib of that member is spaced outwardly or distally beyond the clamping rib of the upper jaw member. A retention rib, engagable with the flange of a cabinet unit to be suspended from a support rail, is provided by the lower jaw member to limit forward-rearward movement of the cabinet unit without restraining lateral movement thereof when the screw is only partially tightened.

7 Claims, 1 Drawing Sheet

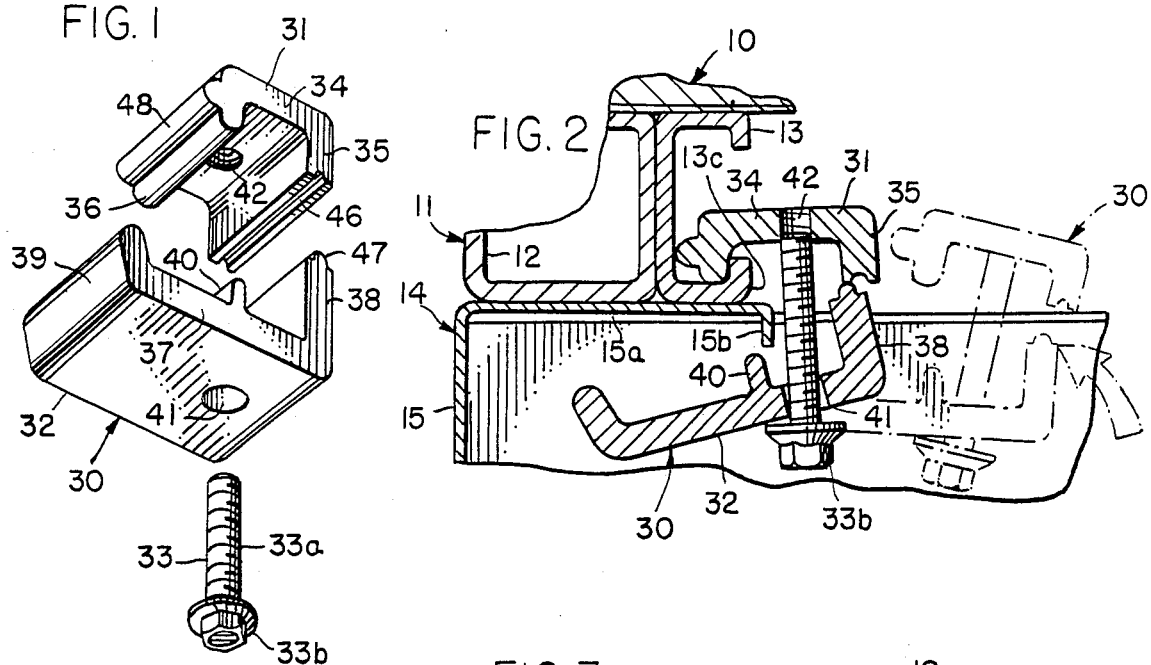
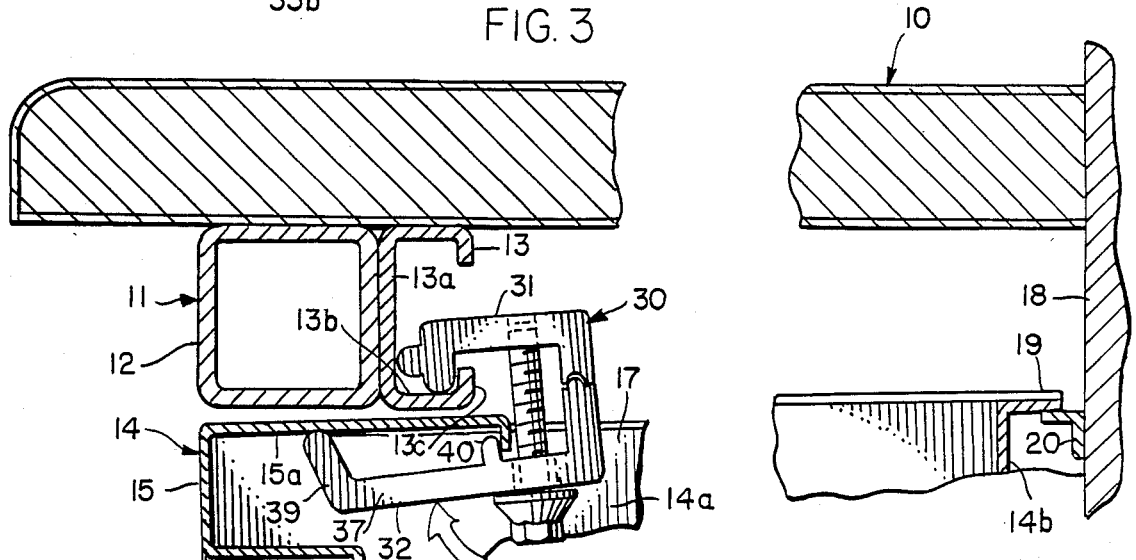
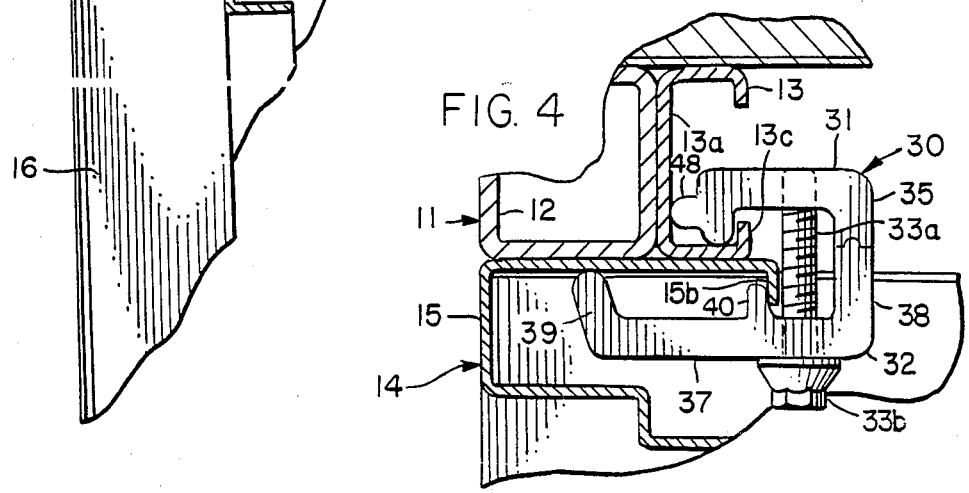

CLAMP FOR CONNECTING MODULAR FURNITURE COMPONENTS

RELATED APPLICATION

This application is a continuation-in-part of my copending application 870,889, filed June 5, 1986, now U.S. Pat. No. 4,717,102 issued 1-5-88.

BACKGROUND AND SUMMARY

In modular furniture construction, such as the type of furniture used in laboratories and offices, cabinet structures (drawer units, door-equipped units, and shelf units) are often suspended from the worktops or their supporting rails. Where such units are screwed or bolted to the supporting structure, attachment is awkward and sometimes quite difficult because the connecting elements are not always readily accessible.and the cabinet units are often heavy and difficult to support while the connecting points are being located and the screws or other connectors are being inserted and tightened. Also, the provision of fixed connecting points prevents or at least greatly limits the extent of adjustment in the position of a cabinet unit after the connectors have been inserted and before they are fully tightened.

Ideally, means should be provided for suspending a cabinet structure so that it may be moved laterally along the width of the worktop and, when the desired position is selected, the mounting means may then be easily tightened to draw the cabinet against the undersurface of the worktop in such a way that all gaps or seams between the parts are tightly closed and the facing surfaces of the parts are disposed in flush relation. While various types of mounting systems have been proposed to permit lateral adjustment of cabinet units, and while clamps of different construction have been disclosed in the prior art, the systems used in the past typically have fallen short of meeting all of these objectives either because of complexity, inconvenience of operation, or inability to achieve both adjustability and security of attachment. Reference may be had to U.S. Pat. Nos. 3,266,762, 3,185,418, 3,333,799, and 3,445,081 for various types of suspension clamps disclosed in the prior art.

In my copending application, Ser. No. 870,889, filed June 5, 1986, I disclose a generally J-shaped clamp with an upstanding stem portion, an upper arm portion, and a hook-shaped lower arm portion. The upper arm portion terminates in a rib that projects towards the lower arm portion and also includes a threaded bore which extends along a line that is generally parallel with the lower arm portion and is spaced above the rib. A screw is threadedly received within the bore and, during use of the clamp, the upper arm portion is hooked over the flange of a support rail and the screw is tightened against the rail to pivot the clamp and to force the top wall of a cabinet unit, supported by the clamp's lower arm portion, upwardly into tight engagement with the rail.

The clamp of the copending application therefore allows a user to shift a loosely suspended cabinet into the desired location beneath the supporting rail of a worktop and then to tighten the clamp with a wrench or other suitable tool, causing the clamp to pivot and draw the cabinet unit upwardly into tight engagement with the rail structure. Two or more such clamps may be used depending on the width of the suspended cabinet unit. Detachment of the cabinet structure is easily accomplished simply by reversing the procedure.

While the clamp of the copending application overcomes most of the shortcomings of the prior art, one disadvantage has now been noted, namely, that while such a clamp in partially-tightened condition effectively suspends the front portion of a cabinet in a way that permits lateral and forward-rearward adjustment in the position of that cabinet, there is a possibility that a user may, in making such an adjustment, draw the cabinet forwardly (towards the user) to such an extent that the cabinet's rear flange or lip could become disengaged from the support beam of the worktop or wall structure. Thus, as shown in FIG. 3 of that application, if the cabinet unit 14 were drawn forwardly (to the left) a sufficient distance, lip 19 would release from beam 20. While in such a case the front of the cabinet 14 would still be supported by the clamp or clamps 30, a twisting or torquing action might nevertheless occur and result in damage to the cabinet unit. In any event, the disengagement of the lip from the support rail would require the installer to repeat some of the installation steps and to exercise care that the same over-adjustment does not occur again.

An important aspect of this invention therefore lies in providing a clamp which is simple in construction and operation, which allows a user to shift a loosely-suspended cabinet into the desired location beneath the supporting rail of a worktop and then to tighten the clamp with a wrench or other suitable tool, causing the clamp to pivot and draw the cabinet unit upwardly into tight engagement with the rail structure, and which allows the user to adjust the position of the cabinet structure prior to tightening of the clamp without the risk that such adjustment might result in the unintentional release of the rear portion (or any other portion) of the suspended cabinet unit.

Briefly, the clamp is composed of three pieces: an upper jaw member, a lower jaw member, and a screw that adjustably connects the two jaw members together. The upper jaw member includes a horizontally-extending body having a depending bearing portion at one end and a depending clamping rib at the opposite end thereof. The lower jaw member similarly includes a horizontally-extending body having an upstanding bearing portion at one end and an upwardly-projecting clamping rib at the opposite end thereof. In addition, the lower jaw member is provided with an intermediate retention rib. The adjustment screw extends vertically, when the clamp is in use, having its head disposed beneath the lower jaw member with its threaded shank extending upwardly through an enlarged opening in that jaw member. The threaded upper end of the screw is threadedly received in an opening provided by the upper jaw member. Because the opening in the lower jaw member is substantially larger than the shank of the screw, the two jaw members may not only be moved away from each other when the screw is loosened but may also be angularly displaced with respect to each other. The jaws may therefore be spread apart when the elements are loosely pre-assembled to permit the clamp to be fitted in place. Partial tightening of the screw assures that the clamp will not become released and, further, that forward-rearward adjustment of the cabinet will be limited by the retention rib of the clamp, and by the adjustment screw, to preclude unintended release of the cabinet from its suspended condition. With the clamp in partially tightened condition, the cabinet is free to be slid laterally into its desired position of adjustment, at which time the clamp is tightened to secure the cabinet in the selected position.

Other features, objects, and advantages will become apparent from the specification and drawings.

DRAWINGS

FIG. 1 is an exploded perspective view of a clamp embodying this invention.

FIG. 2 is a fragmentary sectional view illustrating the clamp with its parts in the loosely pre-assembled condition they would assume at the time the clamp is fitted in place to suspend a cabinet from a supporting rail.

FIG. 3 is a fragmentary sectional view illustrating the clamp in operative relation and with its screw in partially tightened condition.

FIG. 4 shows the clamp of FIGS. 2 and 3 with its screw fully tightened to secure a cabinet structure in suspended condition.

DETAILED DESCRIPTION OF PREFERRED EMBODIMENT

Referring to FIG. 3, the numeral 10 designates a worktop equipped with, and reinforced by, a supporting rail or beam assembly 11. In the illustration given, the assembly includes a box beam 12 and a channel beam or rail 13. The two may be welded together to provide rigid bracing for the worktop as well as rigid support for a cabinet structure 14 suspended beneath the beam assembly. In all essential respects, the worktop, beam, rail, and cabinet structure are identical to those elements described in copending application 870,889, the disclosure of which is incorporated by reference herein. For purposes of this invention, the configuration of the box beam and channel member is not critical, except in certain respects described below, and in fact the box beam may be omitted or replaced by a reinforcing element of different configuration.

With respect to the supporting beam or rail 13, the channel configuration is highly desirable but not essential. Of critical importance, however, is the fact that the support rail 13 has a front wall portion 13a, a rearwardly-extending wall portion 13b, and a flange 13c that extends in the same direction as the front wall portion 13a.

The cabinet unit or module 14 may be any of a variety of sizes and designs, all as well known in the art. Ordinarily, such a cabinet unit has a perimetric rectangular front frame 15, side walls 14a, rear wall 14b, and a bottom wall (not shown). The front opening 16 defined by frame 15 may be fitted with a door (not shown). Alternatively, drawers may be mounted within the cabinet or open shelving may be provided therein (not shown). Since such elements are well known and do not constitute part of this invention, except in the respects noted below, further discussion of their non-critical aspects is believed unnecessary herein.

The perimetric front frame 15 includes an upper frame member 15a terminating along its rear limits in a depending rear flange 15b. An access opening 17 is provided behind the flanged upper frame member. Means are provided by the cabinet unit to support its upper rear edge from a wall 18 (or wall panel structure); in the embodiment illustrated, the cabinet is provided with a rearwardly projecting top flange or lip 19 which rests on a support beam or rail 20 secured to the wall or wall panel.

As shown in the drawings, particularly in FIG. 1, clamp 30 is composed of three pieces, namely an upper jaw member 31, a lower jaw member 32, and a connecting adjustment screw 33. The upper jaw member 31 is of generally inverted U-shaped cross section, having a horizontal (in use) arm or body portion 34, a depending rear bearing portion 35, and a depending front clamping rib 36. Similarly, the lower clamping member 32 is of U-shaped cross section and includes a generally horizontal arm or body portion 37, an upstanding rear bearing portion 38, and an upstanding clamping rib 39.

It will be observed that the body 37 of the lower jaw member has a substantially greater horizontal extent than body 34 of the upper jaw member and, further, that the lower jaw member is additionally provided with an intermediate retention rib 40 spaced from both the upstanding bearing portion 38 and the upstanding clamping rib 39. An opening 41 extends vertically through the body 37 at a point between the retention rib 40 and the upstanding bearing portion 38. The opening is unthreaded and substantially larger in diameter than the elongated threaded shank 33a of adjustment screw 33 although smaller than the head 33b of that screw.

The upper jaw member 31 is provided with a vertically-extending threaded opening 42 that aligns with opening 41 when the parts are assembled and that threadedly receives the upper end of screw shank 33a. The length of the shank is substantially greater than the combined vertical dimensions of bearing portions 35 and 38 so that, as shown in FIG. 2, the elements of the clamp may be loosely pre-assembled and held together by the screw even though the jaw members are out of contact with each other. Furthermore, because opening 41 is substantially larger than shank 33, the lower jaw member 32 may be pivoted or angled away from the upper jaw member to further increase the distance between the clamping ribs of the respective jaw members (FIG. 2). Such spreading greatly facilitates fitting of the loosened clamp into its operative position, with the jaw members being opened sufficiently wide to permit the flanges 13c and 15b of rail 13 and cabinet frame 15 to pass between clamping rib 36 and intermediate retention rib 40. Thereafter, the adjustment screw 33 may be partially tightened to prevent removal of the clamp (FIG. 3).

Of particular importance is the fact that when the partially-tightened clamp is in its operative position, the support rail's upstanding flange 13c is disposed behind clamping rib 36 and the depending cabinet flange 15b is disposed between retention rib 40 and screw shank 33a. The horizontal distance between the screw shank and the retention rib is sufficiently greater than the thickness of the depending flange 15b to permit limited forward-rearward adjustment of the cabinet but not sufficient to allow lip or flange 19 to disengage from rail 20. Therefore, when the clamp is only partially tightened, a user may easily adjust the cabinet into its desired position without risk that any part of the cabinet might become disengaged from its suspending means. Once the cabinet has been shifted laterally into its desired position, and has been adjusted forwardly or rearwardly so that its front face is flush with the front surface of box beam 12, the screw 33 may be fully tightened to clamp the cabinet against the beam 12 and rail 13 (FIG. 4).

Use of the clamp therefore greatly simplifies the task of suspending a cabinet unit from a support beam. Since the clamp, when partially tightened, supports the cabinet without danger that it might become released from its suspension means, the installer is free to use both hands to shift the cabinet unit into a desired position. Also, in addition to the other advantages described, the construction of the clamp allows it to be inserted in place from any point along the width of the cabinet unit; that is, the clamp is not required to be slid in from an open end of the cabinet unit or rail.

To insure proper interfitting and interlocking of the jaw members 31 and 32, the abutting surfaces of bearing portions 35 and 38 are of tongue and groove construction. In the illustration given, the lower surface of the depending bearing portion 35 is provided with a groove 46 and the upper surface of upstanding bearing portion 38 is provided with a mating tongue 47; however, it will be understood that the orientation may be reversed.

Forward-rearward movement of the upper jaw member 31 with respect to the channel beam or rail 13 should be avoided and, for that purpose, member 31 is provided with a forwardly or distally projecting rib 48 that engages the front wall portion 13a of the support rail when the clamp is in place. The depending rib 36 engages both the lower wall portion 13b and the flange 13c of the rail and, in combination with rib 48, secures the upper jaw member against forward-rearward movement with respect to the support rail 13.

It is believed apparent from the foregoing that while the clamp has particular utility in suspending a cabinet module from a horizontal support rail or beam, the clamp might also have at least limited use in drawing a side frame member of a cabinet structure into tight engagement with a vertical support beam. In the foregoing, details of a preferred embodiment of the invention have been disclosed in considerable detail for purposes of illustration, but it will be understood by those skilled in the art that many of these details may be varied without departing from the spirit and scope of the invention.

I claim:

1. In combination with a support frame having a horizontal rail and a cabinet removably suspended from said rail, said cabinet including a top frame member with a depending rear flange and said rail including a front wall portion, a horizontal wall portion extending rearwardly from said front wall portion, and a flange projecting upwardly from said horizontal wall portion and spaced behind said front wall portion; a clamp comprising separable upper and lower jaw members and adjustable connecting means extending therebetween; said upper jaw member including a generally horizontally-extending arm having a bearing portion at one end and a depending clamping rib at the opposite end thereof; said lower jaw member including a generally horizontally-extending arm having a bearing portion at one end thereof, an upstanding clamping rib at the opposite end thereof, and an upwardly-projecting retention rib spaced between said clamping rib and said bearing portion of said lower jaw member; said lower jaw member having a lower opening extending vertically therethrough at a point between said bearing portion thereof and said retention rib; said upper jaw member having a threaded opening therethrough alignable with said lower opening of said lower jaw member; said connecting means comprising an adjustment screw having a head disposed beneath said lower jaw member and a threaded shank extending upwardly through said lower opening and threadedly received in said upper opening; whereby, when said clamping rib of said upper jaw member is hooked over said flange of said supporting rail and said clamping rib of said lower jaw member is hooked beneath said top frame member of said cabinet forwardly of the depending rear flange thereof, the tightening of said screw will cause said jaw members to move towards each other and thereby lift said cabinet into engagement with said rail; said retention rib and said screw shank being engagable with said depending rear flange of said cabinet to limit relative forward-rearward movement of said cabinet without restraining lateral movement thereof when said screw is only partially tightened.

2. The combination of claim 1 in which said arm of said lower jaw member is substantially longer than said arm of said upper jaw member.

3. The combination of claim 1 in which said bearing portions of said upper and lower jaw members extend towards each other.

4. The combination of claim 3 in which one of said bearing portions is provided with a groove and the other of said bearing portions is provided with a tongue receivable in said groove.

5. The combination of claim 4 in which the combined height of the bearing portions of said upper and lower jaw members exceeds the combined height of the clamping ribs of said jaw members.

6. The combination of claim 1 in which said upstanding clamping rib of said lower jaw member projects substantially above the upper limits of said retention rib.

7. The combination of claim 1 in which said upper jaw member is provided at said opposite end thereof with a second rib; said second rib projecting from said opposite end in a direction away from said one end of said upper jaw member.

* * * * *